United States Patent

Edwards et al.

[15] 3,681,456

[45] Aug. 1, 1972

[54] THIOUREA COMPOUND

[72] Inventors: Gayle Dameron Edwards, Nederland; Philip Hotchkiss Moss, Austin, both of Tex.

[73] Assignee: Jefferson Chemical Company, Inc., Houston, Tex.

[22] Filed: May 26, 1969

[21] Appl. No.: 827,989

[52] U.S. Cl. ..................... 260/552 R, 260/77.5 AQ
[51] Int. Cl. ............................................. C07c 157/06
[58] Field of Search ................................. 260/552 R

[56] References Cited

UNITED STATES PATENTS 3,168,560  2/1965  Levis et al. ................. 260/552 R
2,674,619  4/1954  Lundsted ................. 260/552 R X

FOREIGN PATENTS OR APPLICATIONS 804,299  11/1958  Great Britain

*Primary Examiner*—Leon Zitver
*Assistant Examiner*—Michael W. Glynn
*Attorney*—John R. Kirk, Jr., H. G. Jackson and Terrence Dean Dreyer

[57] ABSTRACT

New compounds having the formula [HO-alkylene-(O-alkylene)$_x$NH]$_2$C = S are chain extenders for polyurethanes.

1 Claim, No Drawings

THIOUREA COMPOUND

BACKGROUND OF THE INVENTION

1. Field of the Invention

The invention pertains to new thiourea compounds.

2. Description of the Prior Art

Robert Gehm's U.S. Pat. No. 3,301,823 (1967) teaches the use of dihydrazino-di-s-triazine compounds as chain extenders for polyurethanes.

SUMMARY OF THE INVENTION

New compounds having the formula [HO-alkylene-(O-alkylene)$_x$NH]$_2$C = S wherein the alkylene groups contain two to four carbon atoms and $x$ is an integer from one to four are chain extenders for polyurethanes.

DESCRIPTION OF THE PREFERRED EMBODIMENTS

New compounds useful as chain extenders for polyurethanes are prepared by reacting polyglycol amines of the formula NH$_2$(CHR$_1$CHR$_2$O)$_x$H, where R$_1$ and R$_2$ are hydrogen or alkyl groups and $x$ is an integer from 1 to 4, with carbon disulfide.

EXAMPLE I

Hydroxyethoxyethylamine (315 g., 3.0 mole) and 300 g. of water were placed in a two liter three-neck round bottom flask equipped with a mechanical stirrer, reflux condenser, thermometer and gas inlet. Carbon disulfide (122 g., 1.6 moles) was added over a 30 minute period with stirring and cooling with a water bath. The reaction mixture was stirred and heated at 97°–98 C. until the production of H$_2$S had essentially ceased (≈9 hours). A small flow of nitrogen was passed through the system during the reaction period. A portion of the water (102 g.) was distilled from the reaction mixture. The remainder of the water was removed by azeotropic distillation with benzene (200 ml.). Benzene was distilled from the reaction mixture at atmospheric pressure and the product stripped to 110° C. /<1 mm. The product was a light yellow, viscous liquid and weighed 374 g. (Theory for the thiourea = 378 g.). Properties of the 1,3-bis(2,2-hydroxy-ethoxyethyl)-2-thiourea are shown below:

| | S<br>Found ‖<br>Calculated for C (NHCH$_2$CH$_2$O CH$_2$CH$_2$OH)$_2$ | OH Number | %N | MW<br>Osmometer |
|---|---|---|---|---|
| | | 659 | 11.1 | 252 |
| | | 445 | 11.0 | 252 |

Substituted thioureas exist in the

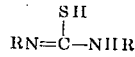

form to a large extent and the OH number of the product supports this structure (OH number calculated for three reaction hydrogens = 670). In the

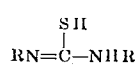

form, the compounds of this invention can act as cross-linking agents for urethanes. For the purposes of this invention, the words "chain extenders" define both linear chain extender or cross-linking properties of the compounds of the invention.

EXAMPLE II

The 1,3-bis(2,2-hydroxyethoxyethyl)-2-thiourea of Example I is a chain extender for a polyurethane. In the table below, the properties of a polyurethane cured in the presence of 1,3-bis(2,2-hydroxyethoxyethyl)-2-thiourea are compared to a polyurethane cured without 1,3-bis(2,2-hydroxyethoxyethyl)-2-thiourea. The polyurethane cured without 1,3-bis (2,2-hydroxyethoxyethyl)-2-thiourea is labeled "Blank" in the table.

The polyurethane was made by blending a 3,000 molecular weight triol (900 grams) and clay filler (660 grams) until they were thoroughly mixed. Trimethylolpropane (6.0 grams) was then added and this mixture was heated under vacuum to 120° C. to remove anY water. The mixture was then cooled to 75° C. at which point 1,3-bis(2,2-hydroxyethoxyethyl)-2-thiourea was added. After cooling to room temperature (26° C.) a 650 gram portion of the mixture was mixed with sufficient polymeric isocyanate to produce an isocyanate-to-hydroxyl ratio of 1.15. The polymeric isocyanate had a functionality of about 2.7–2.8. After adding dibutyltin dilaurate catalyst and stirring rapidly for 30 seconds, the mixture was cast in an aluminum mold and allowed to cure at room temperature.

The chain extender properties of 1,3-bis(2,2-hydroxyethoxyethyl)-2-thiourea are illustrated by the increased elongation and the lower compression resistance shown in the data of the table below. The elastomeric polyurethane containing 1,3-bis(2,2-hydroxyethoxyethyl)-2-thiourea has lower Shore A durometer hardness and about 20 percent higher tensile strength than the blank. Also, the Component B in the table has a lower viscosity when 1,3-bis(2,2-hydroxyethoxyethyl)-2-thiourea is included. The lower viscosity makes the component more fluid, therefore, more workable.

The viscosity of the component B was run on a Crookfield Model LVT Viscometer, using a number 4 spindle. The spindle speed was 12 revolutions per minute for the reading shown in the table and the temperature of the component B was 25° C.

TABLE

| Formulation<br>(Parts per hundred weight) | 1,3-bis(2,2-hydroxyethoxyethyl)-2-thiourea | Blank |
|---|---|---|
| Component B: | | |
| 3000 Molecular Weight Polyol | 50.1 | 52.1 |
| Clay filler | 36.7 | 38.2 |
| Trimethylolpropane | 0.33 | 0.35 |
| 1,3-bis(2,2-hydroxyethoxyethyl)-2-thiourea | 1.4 | None |
| Component A: | | |
| A polymeric isocyanate with about a 2.7-2.8 functionality | 11.4 | 9.2 |
| Catalyst: | | |
| Dibutyltin dilaurate | 0.10 | 0.10 |
| Viscosity | | |
| Component B, 25°C., 12 r.p.m., cps. | 4000 | 7500 |
| Properties | | |
| Shore A hardness (ASTM D 2240–64T) | 69–70 | 72–73 |

| | | |
|---|---|---|
| Tensile strength, pounds per square inch (ASTM D-412-64T, die C) | 921 | 780 |
| Elongation, % (ASTM D 412-64T, die C) | 65 | 35 |
| Tear strength, pounds per lineal inch (ASTM D 624-54, die C) | 47 | 42 |
| Compression load deflection, 10%, pounds per square inch (ASTM D 575-46, Method A) | 269 | 322 |
| Compression set, % (ASTM D 395-61, Method B) | 9.8 | 10.5 |

Results comparable to those in the table, supra, are obtained using other compounds of this invention.

The new compounds of this invention are also useful as corrosion inhibitors for aqueous acidic systems.

Having thus described our invention, we claim:

1. 1,3-bis(2,2-hydroxyethoxyethyl)-2-thiourea of the formula

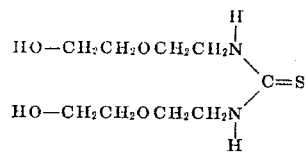

* * * * *